Aug. 28, 1934.   C. B. HUNTMAN   1,971,960
COMBINED CROSSBAR EQUALIZING AND SHOCK
ABSORBING MEANS FOR VEHICLES
Filed May 8, 1934   2 Sheets-Sheet 1
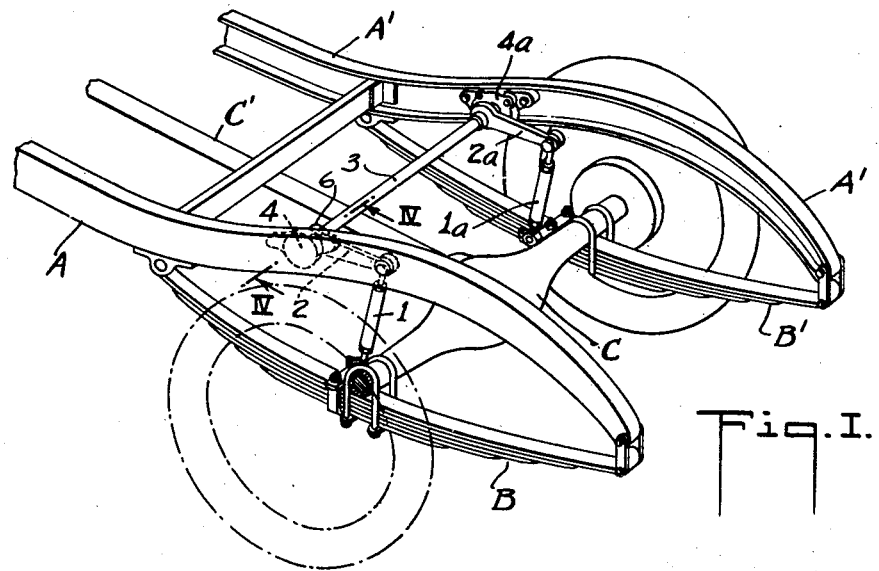
Fig. I.
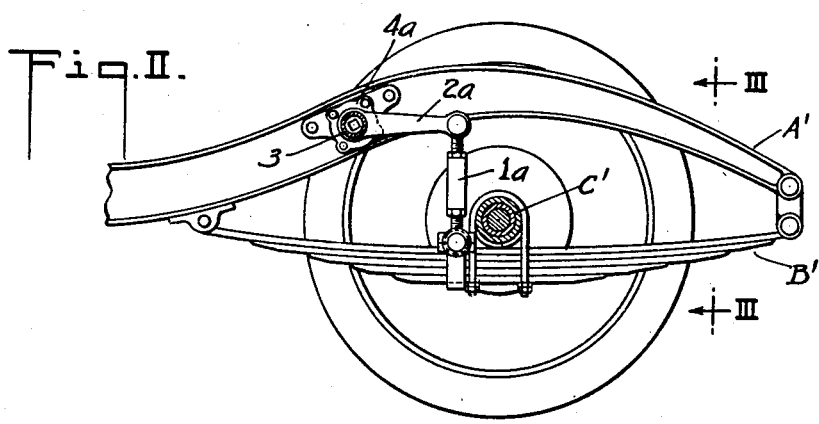
Fig. II.
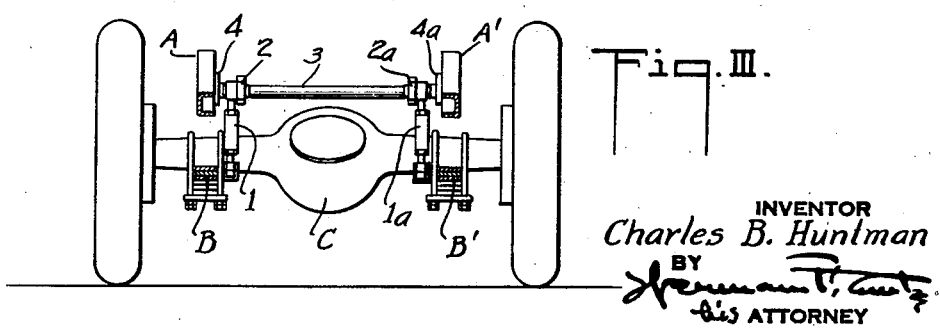
Fig. III.
INVENTOR
Charles B. Huntman
BY
his ATTORNEY

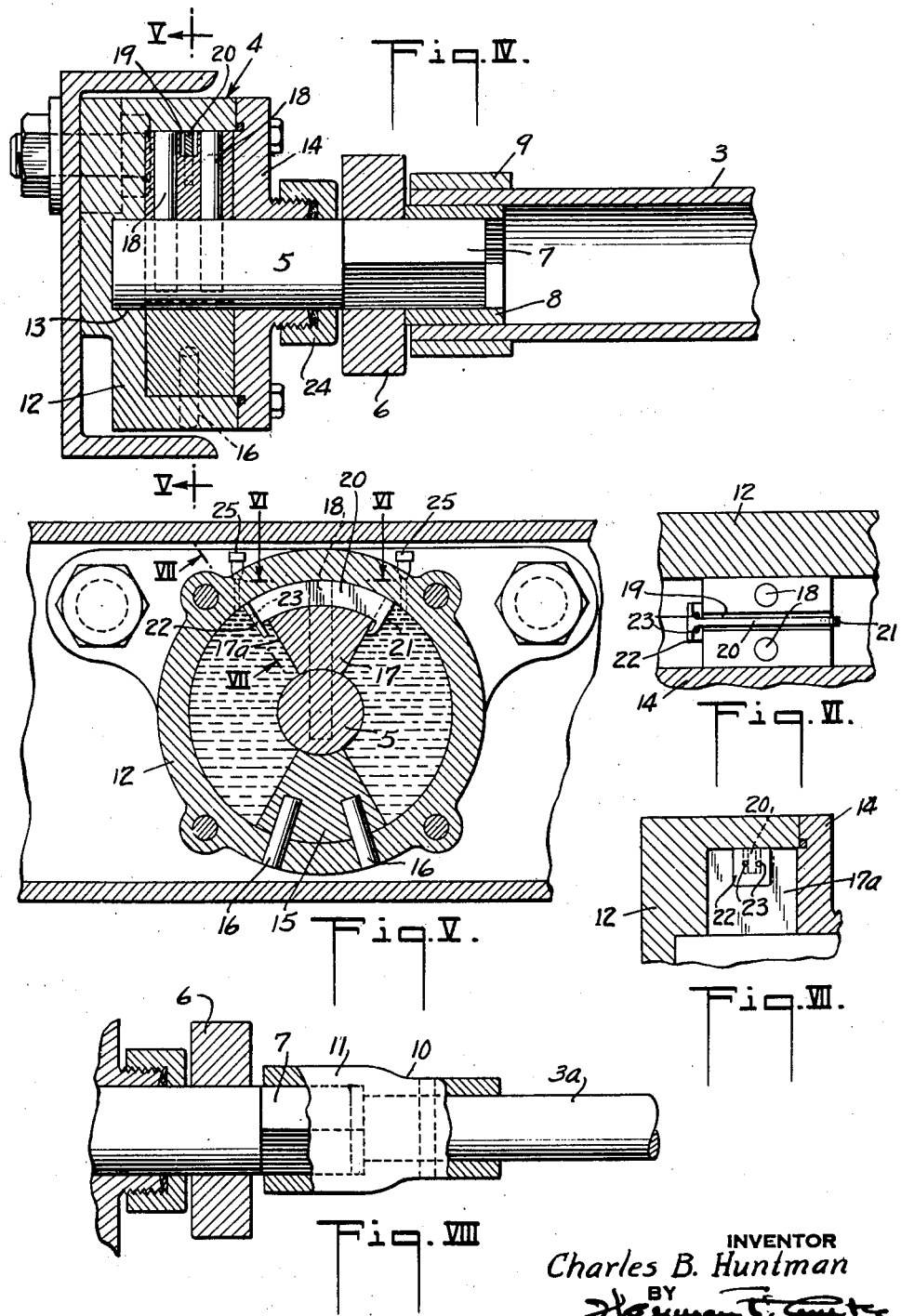
Aug. 28, 1934.   C. B. HUNTMAN   1,971,960
COMBINED CROSSBAR EQUALIZING AND SHOCK
ABSORBING MEANS FOR VEHICLES
Filed May 8, 1934   2 Sheets-Sheet 2
INVENTOR
Charles B. Huntman
BY
his ATTORNEY Patented Aug. 28, 1934

1,971,960

UNITED STATES PATENT OFFICE 1,971,960

COMBINED CROSSBAR EQUALIZING AND SHOCK ABSORBING MEANS FOR VEHICLES

Charles B. Huntman, Plainfield, N. J., assignor to Huntman Stabilizer Corporation Application May 8, 1934, Serial No. 724,532

8 Claims. (Cl. 267—11)

This invention relates to the equalizing or balancing of shocks such as are involved in motor cars when the wheels on one side are displaced by the uneven contour of the road, or when centrifugal strain tends to careen the body when a car at speed is deflecting its course. It involves the absorbing of such shocks or strains, balancing the effect of the strains on both sides of the car, dampening the reaction of any wheel or body displacement due to such shocks or unequal force on opposite sides of the car, and various other advantages which will appear from the more detailed description hereinafter set forth and be pointed out in the claims. In general, it relates to mechanism or apparatus, or car equipment which aims to prevent sidesway of the body or of the entire sprung mass when rounding curves at speed, and to prevent or minimize side-rocking or listing or rolling of the car due to uneven road surfaces, particularly when wheel or wheels on one side engage obstacles or ruts different in magnitude from those engaged by the wheel or wheels on the opposite side.

This particular application involves apparatus or structure to accomplish such advantageous results through instrumentalities including mechanical means transmitting across the car the effect of vertical displacement of the wheels on opposite sides and with said mechanical transmitting means a direct connection with shock absorbing means fixedly mounted on the sprung mass.

In the particular form of construction herewith illustrated and hereafter specifically described, I embody in the apparatus or car equipment a transverse torque-bar directly connected at each end with a shock absorber element, and an arm at each side of the car responsive in common to torque on the bar or the shock absorber action, with each arm adapted to oscillate with the oscillation of its shock absorber shaft, and having the free movable end of each arm connected by a suitable link to a part or member of the unsprung mass, such as the end of the axle housing, or other member supporting and subject to vertical movement with the wheel and which is connected by a spring to the sill or other suitable member of the frame constituting part of the sprung mass. In brief, this particular form comprises a two-way shock absorber on each side of the car, namely, mounted on each sill and having generally horizontal levers and a direct torque-bar connection between said shock absorber devices on either side.

This application involves a form of development I have made and tested, relating to the invention set forth in my copending application filed August 24, 1925, Serial No. 51,908, and more particularly an improvement on the form of said invention forming the subject-matter of my application filed May 2, 1934, Serial No. 723,489 and with respect to the latter it aims to simplify construction by the reduction of parts, the ease of manufacture and assembly in cars with, in general, greater simplicity and economy.

While shown and described with respect to a specific form, the subject-matter hereof involves stabilizing and dampening apparatus interconnecting a wheel-borne member or support as part of the unsprung mass associated each with one of a pair of wheels on opposite sides of the car, thereby transmitting relative vertical motion of each wheel or the force due to vertical shock on the wheel, on each side to a single lever or like member adapted to oscillate a cross-bar transmitting mechanical instrumentality, which in turn is directly connected on each side of the car with shock absorbing means which essentially dampens the recoil of the spring on each side of the car and may absorb some of the shock of compression of the spring, but in a lesser degree than the dampening of the recoil thereof. This constitutes a cross-bar mechanical equalizing means directly connected with shock absorbing means on either side of the car, effecting lateral stabilizing of the car with respect to unequal forces on each side, as well as shock equalizing from side-to-side through the one mechanical cross-car connection.

The invention as hereinafter claimed may be practiced with various modifications and various forms other than that herein specifically shown and described.

The particular form herein illustrated is shown in the accompanying drawings, in which:

Fig. I is a perspective view of the rear end of an automobile, fragmentary, showing the particular form of my invention assembled with the sills, springs and rear axle housing, of the automobile in which I embodied my invention.

Fig. II is a side elevation viewed from the inside of one side sill, of Fig. I.

Fig. III is a rear view of the assembly of my invention in an automobile chassis, on line III—III of Fig. II.

Fig. IV is a vertical section, on enlarged scale, of one of the shock absorbers and its associated lever arm and cross-car torque member,—on line IV—IV of Fig. I.

Fig. V is a vertical section, transverse to the axis of the shock absorber, as shown in the plane V—V of Fig. IV.

Fig. VI is a plan view of the valve and radially outer side of the valve and oscillating piston of the shock absorber, substantially on line VI—VI of Fig. V.

Fig. VII is a radial cross-section of the shock absorber showing one side of the oscillating piston, on line VII—VII of Fig. V.

Fig. VIII is a side elevation, fragmentary, of the torque-bar and portions of the shock absorber, showing a modified coupling between the two as compared with Fig. IV, part broken away.

As illustrated, the chassis parts comprise sills A, A', showing only the rear ends which it will be understood extend to the front of the car and may be of any desired shape. The springs B, B' form the spring or resilient connection between the sill and its associated sprung mass, with the unsprung mass involving the axle housing C which bears the wheels. This axle housing may have any desired connection for transmitting the driving effort delivered to the wheels, as indicated in the propeller shaft or its tube C', or as in other types of construction chain drive connections with the wheel hubs, or any typical forms of construction, understanding that the end of the axle housing C constitutes a wheel-borne member, and has at each end the middle of one of the springs B, B' secured at a suitable spring seat with U bolts or the like.

The wheel bearing member at each end of the rear axle has a suitable rigidly associated connection to which an articulated link 1 is attached in a manner that assures the connecting end to move and deliver substantially the full force of any shock or strain on the wheel, and to move with respect to the frame or sprung weight substantially the same extent as the wheel is operatively deflected in a substantially vertical direction.

The link 1 on one side is connected with the free end of the lever arm 2, and the link 1a on the opposite side is connected with the free end of the lever arm 2a. Both lever arms are operatively connected with the torque or cross-bar 3. Likewise, the lever arms 2, 2a are each operatively connected with the shaft of a shock absorber 4 on one side and a shock absorber 4a on the opposite side, each rigidly attached to the respective sills A, A'. In this manner of the combination of the parts of the apparatus, any amplitude of motion of the wheel on each side of the automobile with respect to the sprung weight of the sill and its superload, causes an oscillation of each arm 2, 2a, and because of the interconnection of the torque-bar 3, both arms oscillate on the axis of their respective shock absorbers a substantially equal angular extent. They would only oscillate in absolute unison except that I prefer to allow a slight yield at one of another joint or connection, in order to absorb slight momentary shocks and prevent any such slight vibration being transmitted to the sprung mass.

The shock absorber 4a, as illustrated in an enlarged scale in Fig. IV, in combination with the transverse or torque-bar 3, comprises in this form of construction the shaft 5 of the shock absorber to which the hub 6a of the arm 2a is attached by a square hole pressed into binding contact with a square end 7 on the shaft 5 of the shock absorber, while this squared end of the shock absorber shaft extending beyond the hub of the lever arm has the end of the torque-bar 3 coupled therewith to rigidly prevent relative rotation. This coupling, as shown in Fig. IV, comprises a bushing 8 inserted in the end of the tube shown in this figure, and having a square hole in the bushing, and after the insertion of this bushing an anti-spreading sleeve or collar 9 is shrunken so as to reinforce the bushing and prevent spreading of the tube, and thereby assure a permanent operative-tight coupling.

As shown in Fig. VIII, the transverse torque member is a solid steel bar 3a which compared with tube 3 is to a degree elastic to torque dependent upon its dimensions and material. This I attach by a coupling member 10, sweated, brazed or pinned, to directly transmit torque, which coupling has an end socket 11 with a squared interior to closely fit the squared end 7 of the shock absorber shaft. While shown as square end couplings, I have made the same with hexagonal sockets and shaft end, suitably dimensioned to resist the strains involved.

The shock absorber elements comprise the casing 12 having an inside end bearing 13 for the shaft 5, and a cap 14 for the casing. Between the inner face of the casing and the cap an abutment 15 is keyed by dowels 16, 16, while a reciprocating piston 17, diametrically opposite the abutment is keyed to the shaft 5 by dowels 18, 18, so that the piston reciprocates with any reciprocating movement imparted by force that turns the shaft 5, which force may be transmitted from the opposite side of the car by the transverse bar 3 acted on by shock or displacement on the opposite side of the car, or relative displacement or force on the adjacent side of the car.

The piston 17 in the shock absorber has a circumferential groove 19 extending uniformly from one face to the other of the piston. In this groove is mounted a segmental valve stem 20, which has at one end a retaining stop 21 limiting the movement of the valve stem in one direction with respect to the valve 17. This valve stem 20 has at its opposite end a valve or plate 22, the inner face of which is accurately finished so that it seats itself oil-tight against the adjacent face 17a of the piston, but in the valve-head or plate 22 I provide two or more holes 23 adapted to restrict the flow of oil to the desired extent, for the purpose of operation of the shock absorber. The valve stem 20 is in section smaller than the groove 19, preferably laterally, so as to permit the passage of oil from one side of the piston to the opposite side. This passageway is of such dimension as to provide for the passage of oil freely from one side—or slightly restricted, to suitably retard the movement of the piston in one direction in displacing the oil on that side of the piston, while on the opposite side the valve-head seats itself and restricts the return-movement of oil depending upon the size of the holes or orifices, so that in the opposite direction of movement of the piston it is dampened or retarded, to effect the desired resistance to recoil of the spring action of the vehicle.

The plate 14 on the inner side of the shock-absorber casing is slid over the sub-shaft, and by suitable gaskets providing oil-tightness it is bolted on to the base portion of the shock absorber casing, and thereafter a gland 24 with suitable packing assures the oil-tightness of the shock absorber, after which the hub 6a of the lever arm 2a may be inserted on the stub end of the shock absorber shaft, and either forced into permanent holding or clamping by a suitable split hub and bolt, or otherwise as desired, to assure positive reciprocation of the lever arm and the shaft, and consequently the piston in the shock absorber.

It will be understood that the circular cylinder space, segmental between the abutment 15 and the movable piston 17, is filled with oil, and it is the passage of the oil from one side of the piston to the opposite side that is controlled by the valve 20, as above described. To fill the cylinder on both sides of the piston filling, holes 25, 25 are provided with suitable cups or caps, so that initial filling of the shock absorbers can be effected with convenience and to completely fill, if desired, the space on each side of the piston. I preferably aim to have them completely filled with no air space at the top, in order that the initial and all movement of the piston will be uniformly controlled by the free or restricted flow of the oil from side-to-side.

The operation of the construction for side stabilizing and for balanced shock-absorbing, it will be understood involves the transmission of any force or relative movement of the wheel-borne member direct without the interposition of any action of spring B, B' through the links 1, 1ᵃ by suitable articulated joint at its connection with the axle housing or a clip on the spring adjacent the axle housing, to a suitable link member herein shown as adjustable to a joint connecting it with the free end of the lever arm, which in turn oscillates the torque-bar 3 either as a solid spring steel bar or as a tube, either of which are cooperatively jointly connected with the shaft of each shock absorber rigidly mounted respectively on the sill on either side of the frame carrying the sprung mass.

It will thus be seen that my invention herein described involves among the various advantages, a simplification of construction of an apparatus of this class. It involves further development and improvement of apparatus in this class previously made by me, and provides for the attachment of a shock absorber on each side sill of a chassis, and having the direct torque-bar connecting the two shock absorbers so that a single arm on each side of the car serves with its link connected to the axle or suitable wheel support, to transmit the motion and the force on each side to the torque-bar for cross-bar transmission of force and motion. At the same time shock absorbers transmit or react through the same, namely, the single pair of lever arms, and likewise the return cross-car force is transmitted by torque through the bar to the shock absorber on the opposite side, as well as the single arm to transmit motion and force to the spring suspension on that side.

The expression "wheel borne means" in the specification refers to any part adjacent and subject to substantially the same vertical movement as the adjacent wheel relative to the sprung mass.

The assembly of parts may be complete as an equalizing and shock-absorbing equipment or rigging, and thereafter installed by the simple attachment of each shock absorber to its sill and the end of each arm link to the axle or wheel-borne means, thus the equipment may be made up as a unit equipment.

While many variations may be made from the construction herein specifically shown and described, what I claim and desire to secure by Letters Patent is:

1. The combination with a vehicle having sprung and unsprung masses, said latter comprising wheels and wheel-borne means, an equalizing cross-bar means movably mounted on the sprung mass, shock absorber means mounted on the bar means, operable by the movement of the cross-bar means and an operative connecting means between the bar and the wheel-borne means.

2. A ride stabilizing equipment for vehicles comprising a shock absorber adapted to be mounted on each side of a vehicle to connect a portion of the sprung mass to a juxtaposed wheel-borne member on its side, and a transverse torque-transmitting mechanical means directly connecting the two shock absorbers adapted to constrain them to cooperative joint action, and means to connect the transverse torque-transmitting means to the wheel borne member operable to function the shock absorbers and to equalize the movement of wheel borne member and the body of the vehicle.

3. A ride stabilizer equipment for automobiles comprising two shock absorbers attached at the sprung mass of the automobile, a mechanical torque-bar directly connecting the two shock absorbers to restrain them to cooperative joint action, a lever arm at each end of the torque-bar rigidly connected to it, and a connection from the movable end of each lever arm adapted to connect it with a part of the unsprung mass on the adjacent side of the automobile.

4. The combination with a vehicle having sprung and unsprung masses comprising wheel borne means, an equalizing cross-bar pivotally mounted on the sprung mass, hydraulic shock absorber means mounted on the cross-bar and operable by movement thereof and operative connections from the bar to wheel-borne means of the unsprung mass.

5. The combination with a vehicle having sprung and unsprung masses, said latter comprising wheels and wheel-borne means, an equalizing cross-bar means movably mounted at the sprung mass, shock absorber means associated with the cross-bar means in substantially axial alignment, and common operative connecting means between the cross-bar and shock absorber means to the wheel-borne means.

6. The combination with a vehicle having sprung and unsprung masses, the latter comprising wheels and wheel-borne means, an equalizing cross-bar means movably mounted at the sprung mass, hydraulic shock absorber means associated with the cross-bar means and operative connecting means between the cross-bar and shock absorber means to the wheel-borne means.

7. A ride stabilizing equipment for vehicles comprising an hydraulic shock absorber adapted to be mounted on each side of a vehicle to functionally connect a portion of the sprung mass to a juxtaposed wheel-borne member on its side, and a transverse torque-transmitting mechanical means directly connecting the two hydraulic shock absorbers and means to connect the transverse torque-transmitting mechanical means to the wheel borne member operable to function the shock absorbers and to equalize the movement of wheel borne member and the body of the vehicle.

8. In a ride stabilizer for vehicles having sprung and unsprung masses with a pair of wheels each having wheel-borne means, a lever on each side of the sprung mass supported to oscillate at one end each having its movable end linked to respond to displacement of the wheel-borne means with respect to the sprung mass, a cross car torque-bar operatively connected to oscillate with the arms, a fluid chamber mounted adjacent each bearing of the oscillating members, a piston in said fluid chamber responsive to oscillation of the arms and torque-bar, and means to retard the piston movement in one direction effective to dampen in common the oscillation of both the arms and the torque-bar.

CHARLES B. HUNTMAN.